Patented Sept. 26, 1950

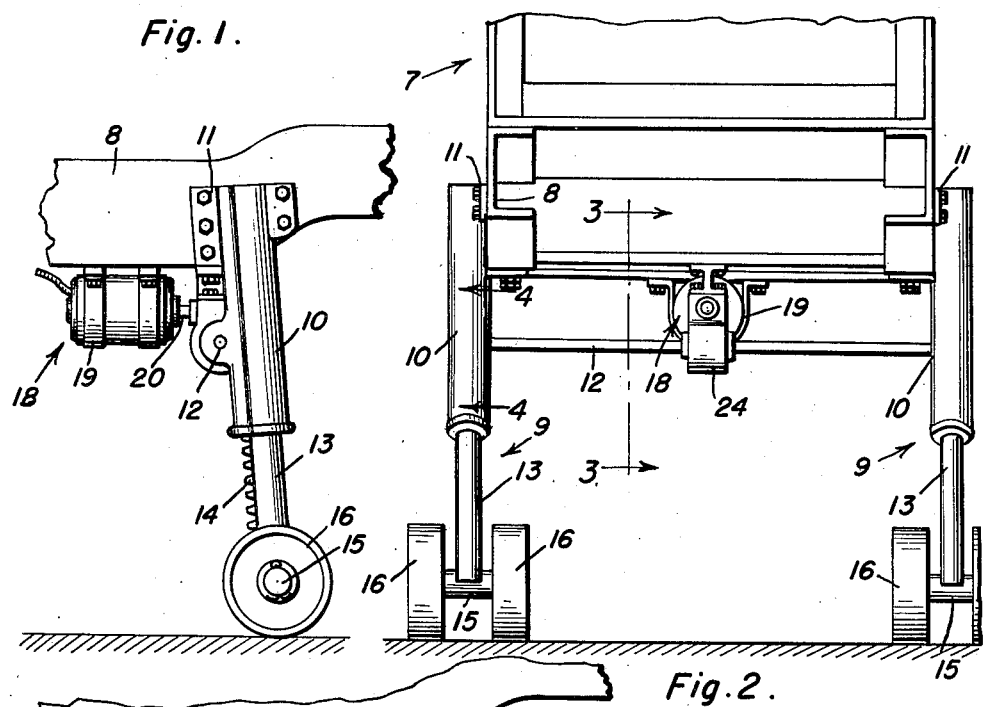
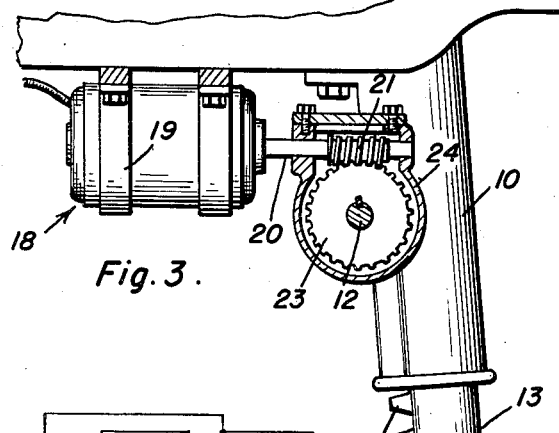
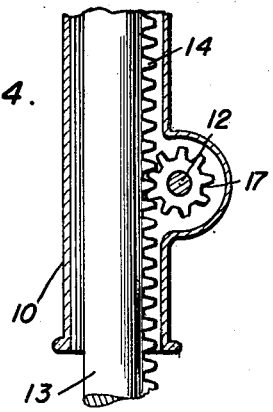
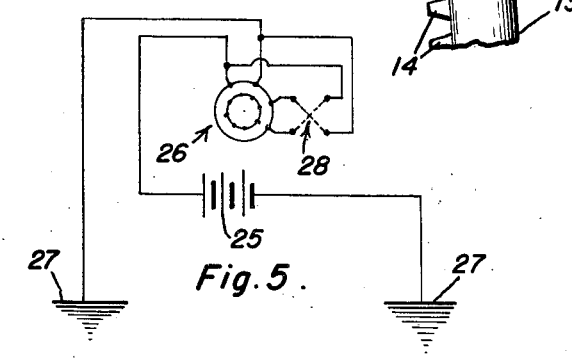

2,523,962

UNITED STATES PATENT OFFICE 2,523,962

ELECTRIC OPERATING DEVICE FOR RAISING AND LOWERING LANDING GEAR FOR SEMITRAILERS

Edwin K. Mahaffey and William E. Mahaffey, Memphis, Tenn.

Application December 9, 1947, Serial No. 790,686

1 Claim. (Cl. 254—86)

The present invention relates to certain new and useful improvements in landing gears for semi-trailers, for example, large-sized styles which are used for hauling and which are detached at the point of destination from the lead or powering truck.

Although there are no landing gears which are standard in construction, retractible and projectible jack-type structures are common in the trade. These structures are ordinarily characterized by wheel-equipped jacks which are operated by rack and pinion means or by an equivalent gearing arrangement. When on the road, the wheel supported shaft portions simply retract into their cylinders to clear the ground. When the destination is reached for parking, loading or other purposes, the wheel-supported portion is projected and the wheels rest on the ground and the entire front end of the trailer is thus elevated to the desired plane. As a general proposition the jacks are mechanically operated through the medium of a hand actuated lever or equivalent structure.

The purpose of the present invention is to provide motorized gearing to rotate the pinions which, in turn, operate the racks and thus provide the desired jacking and lowering results.

Other objects and advantages will become more readily apparent from the following description and the accompanying illustrative drawings.

In the drawings:

Figure 1 is a fragmentary side elevational view showing one of the jack units forming a complemental part of the landing gear as a whole.

Figure 2 is a front end elevation with our invention incorporated.

Figure 3 is an enlarged fragmentary sectional and elevational view on the vertical line 3—3 of Figure 2, looking in the direction of the arrows.

Figure 4 is a section on the line 4—4 of Figure 2, also looking in the direction of the arrows.

Figure 5 is a diagrammatic view of a simple wiring arrangement.

Referring now to the drawings by distinguishing reference numerals and, for instance, to Figure 2 it will be seen that the numeral 7 denotes, comprehensively speaking, a semi-trailer of the style herein under consideration, the same having a suitable chassis or framework 8. The projectible and retractible jacks, which are duplicates of each other constitute the landing gear and these jacks are denoted by numerals 9. Each jack comprises a cylinder 10 having flanges bolted or otherwise secured as at 11 to the chassis. Each cylinder has a bearing for the end portion of a horizontal motion-transmitting shaft 12. The projectible and retractible jack shaft is denoted by the numeral 13 and is telescopically operable in the cylinder and is provided with rack teeth 14. The lower T-head is denoted at 15 and this carries the idling rollers or wheels 16, there being a pair of such wheels shown in Figure 2. As shown in Figure 4, the shaft 12 is provided with a cog or pinion 17 which operates the coacting rack. In the trade various ways and means are employed for imparting motion to the pinion shaft. In the present invention, we provide a substantial and reliable adaptation characterized by an electric motor 18 saddled in hangers 19 suitably suspended from the vehicle frame work. The motor drives a shaft 20 which as shown in Figure 3 is provided with a worm 21 which meshes with a worm gear 22 keyed on the pinion shaft 12. A suitable casing 24 serves to provide a housing for the gearing.

Reviewing the invention it will be seen that landing gears of projectible and retractible types are, of course, broadly old when used in connection with forward end portions of semi-trailers. Therefore, what we have done is to provide simple jacks which are bolted at opposite points to the frame of the trailer and which have wheel-equipped shaft portions and rack and pinion means for operating the shaft portions, said means including a shaft, said shaft having a gear taking power from a worm on a motorized shaft with the motor supported conveniently on the underside of the trailer, whereby to provide a simple and practical motorized drive for so-called semi-trailer landing gears.

Reference is had now to Figure 5 showing the wiring diagram, wherein it will be observed that 25 denotes a battery, 26 the motor, 27 the grounds and 28 the switch means for the reversible motor 26. The wires are appropriately inter-related with these major electrical parts. It is understood, of course, that we are primarily interested in the mechanical phases of the invention.

It is thought that persons skilled in the art to which the invention relates will be able to obtain a clear understanding of the invention after considering the description in connection with the drawings. Therefore, a more lengthy description is regarded as unnecessary.

Minor changes in the shape, size and rearrangement of details coming within the field of invention claimed may be resorted to in actual practice, if desired.

Having described the invention, what is claimed as new is:

In a structural combination of the class described, a semi-trailer including a chassis, jack cylinders arranged in opposed relation on opposite sides of the chassis and rigidly fastened to and depending therefrom, said cylinders having bearings, a motion transmitting shaft having its end portions journaled in said bearings, said end portions being provided with pinions and said pinions projecting for operation into said cylinders, wheel-equipped jacking shafts telescopically fitted into the cylinders, said shafts having racks and the pinions being in operative connection with said racks, an electric motor mounted on the underside of said chassis in the vicinity of said cylinders, and a short operating connection between the motor and pinion shaft including a motor driven shaft, a worm on said shaft, and a worm gear on said pinion shaft of which said worm is in operative meshing relationship.

EDWIN K. MAHAFFEY.
WILLIAM E. MAHAFFEY.

REFERENCES CITED

The following references are of record in the file of this patent:

UNITED STATES PATENTS

| Number | Name | Date |
|---|---|---|
| 1,794,661 | Williams | Mar. 3, 1931 |
| 2,233,135 | Ketel | Feb. 25, 1941 |